Sept. 3, 1963 C. A. WHITNEY ET AL 3,102,342
PRECISION GAGING SYSTEMS AND APPARATUS
Filed June 2, 1960 3 Sheets-Sheet 1
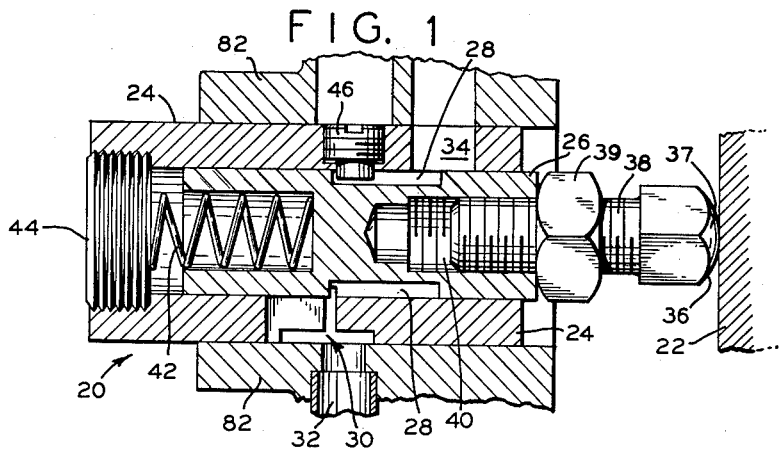
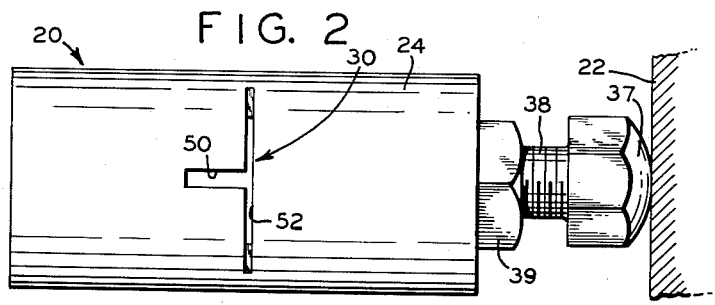
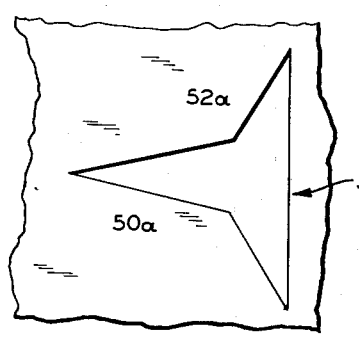
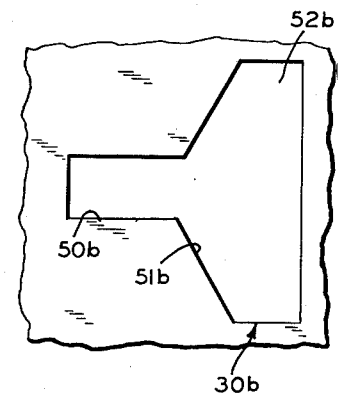
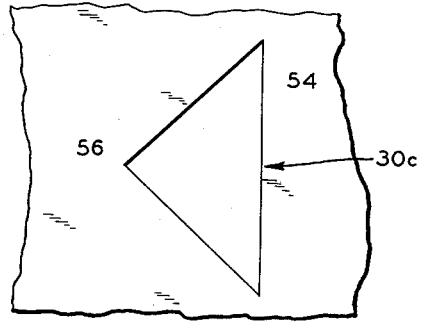
INVENTORS.
CHARLES A. WHITNEY
EVERETT A. HOLLIS
BY
BLAIR, SPENCER & BUCKLES
ATTORNEYS.

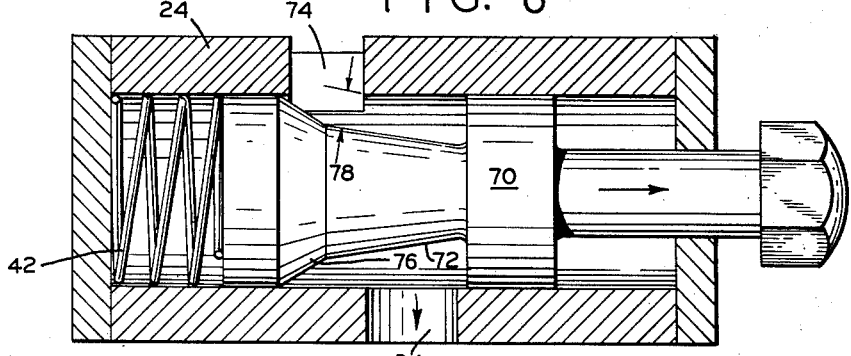
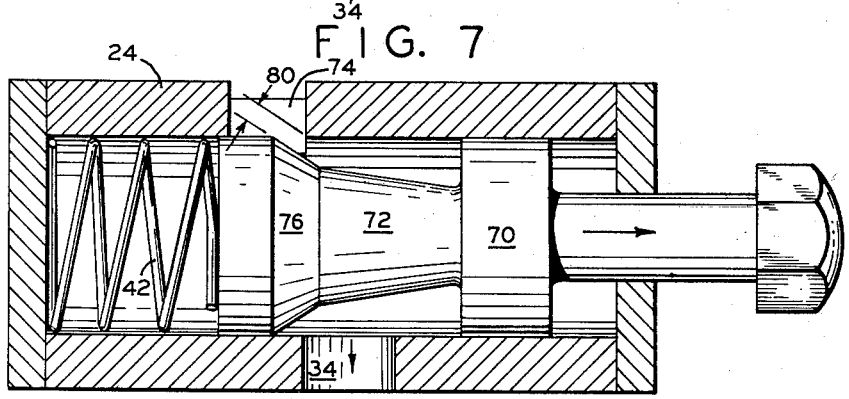
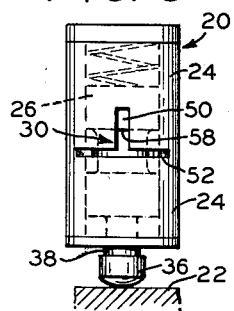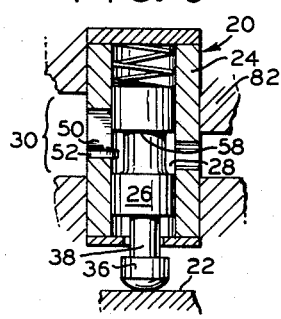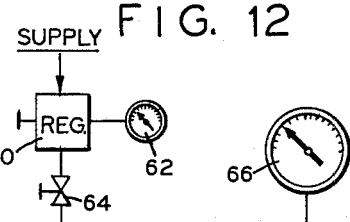
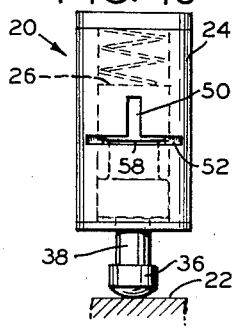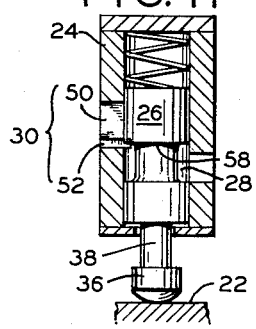

*INVENTORS.*
CHARLES A. WHITNEY
EVERETT A. HOLLIS
BY
BLAIR, SPENCER & BUCKLES
ATTORNEYS.

tem incorporating the present invention;

United States Patent Office
3,102,342
Patented Sept. 3, 1963

3,102,342
PRECISION GAGING SYSTEMS AND
APPARATUS
Charles A. Whitney, Bloomfield, and Everett A. Hollis, Granby, Conn., assignors to Pratt & Whitney Company, Incorporated, Hartford, Conn.
Filed June 2, 1960, Ser. No. 33,467
10 Claims. (Cl. 33—169)

The present invention relates to fluid gaging systems employing a high-precision sensing head, and more particularly to a sensing head which provides a non-linear signal in response to dimensional changes of the work being gaged.

Dimensional gaging systems employing a movable sensing or gaging element have proved useful in both manual and automatic control of machining operations. Such systems often employ a sensing or gaging head assembly for throttling a stream of gaging fluid to provide a changing back pressure as the work being gaged changes in dimension during machining. Such back pressure systems of the prior art suffer from a serious disadvantage, however, in that they normally provide a substantially linear response, requiring continuous monitoring of an indicator by a highly-observant operator in order to stop the cutting operation when the desired dimension has been achieved.

Accordingly, a principal object of the present invention is to provide gaging systems affording high-precision indications of work dimensions.

Another object of the invention is to provide gaging systems of the above character affording non-linear indications of the preselected target dimension gaged.

A further object of the invention is to provide a sensing head for use in fluid gaging systems, such as compressed air gaging systems of the above character adapted for either stationary or movable mounting adjacent the work to be gaged.

Another object of the invention is to provide economical sensing heads of the above character having a minimum number of moving parts.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a sectional top plan view of a sensing head employed in one system of the present invention;

FIGURE 2 is a side view of the sensing head shown in FIGURE 1;

Figure 13:
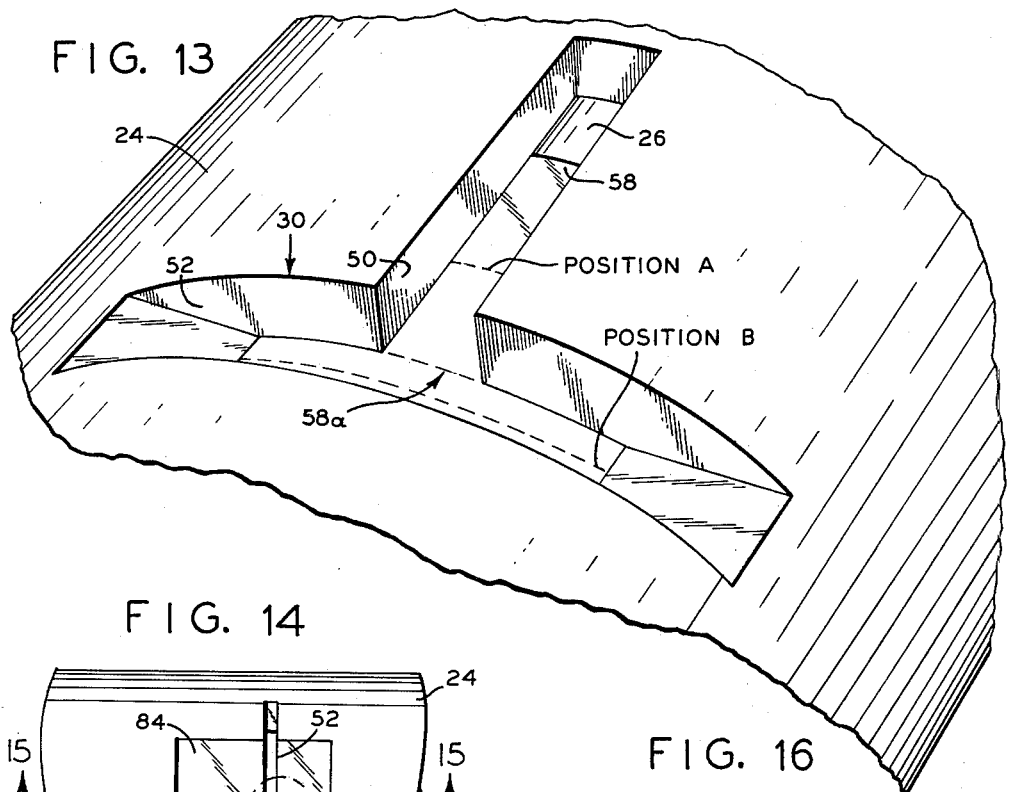
Figure 14:
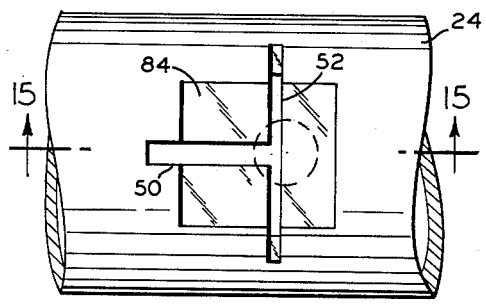
Figure 16:
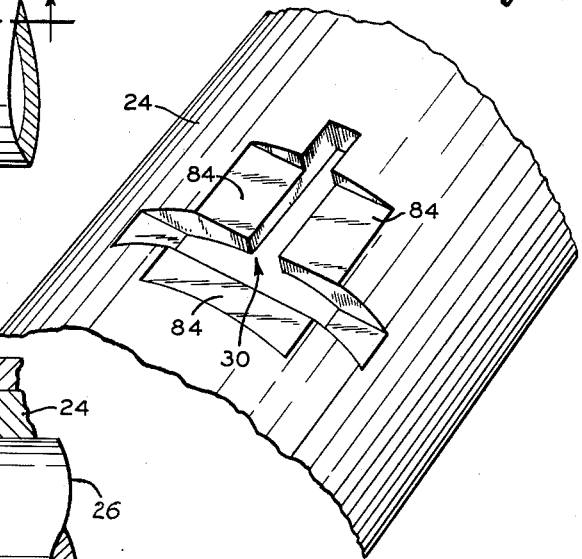
Figure 15:
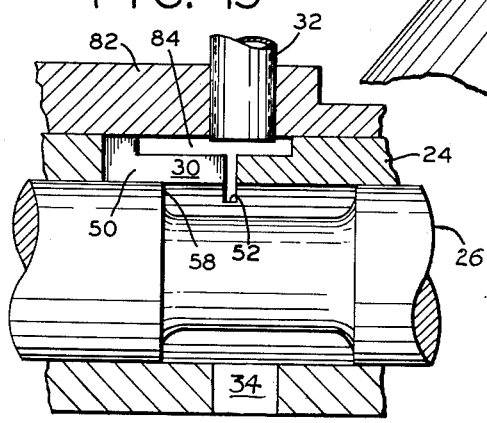

FIGURES 3, 4, and 5 are diagrammatic developed plan views of different forms of throttle valve apertures employed with modified embodiments of the present invention;

FIGURE 6 is a sectional top plan schematic view of a different form of sensing head employed in another embodiment of the invention;

FIGURE 7 is a similar top plan sectional view of the embodiment of FIGURE 6 with its plunger in a different gaging position;

FIGURES 8, 9, 10, and 11 are schematic views showing two different plunger positions in a sensing head of the kind shown in FIGURE 1;

FIGURE 12 is a schematic diagram of a gaging system incorporating the present invention;

FIGURE 13 is a perspective diagrammatic view of the throttle valve aperture formed in a sensing head casing of the present invention;

FIGURE 14 is a fragmentary top view of a sensing head casing of the kind shown in FIGURE 13 having an entrance aperture adjacent the throttle valve aperture;

FIGURE 15 is a fragmentary sectional side elevation view of the casing shown in FIGURE 14 with its adjoining housing member and compressed air supply conduit; and FIGURE 16 is a fragmentary perspective view of the entrance aperture and throttle valve aperture of FIGURES 14 and 15.

Similar reference characters refer to similar parts throughout the several views of the drawings.

The gaging systems of the present invention provide great accuracy in the gaging of continuously-varying dimensions during machining operations, for example. High-precision indications of measurements approaching the target dimension are provided because the dimension-sensing heads of these systems provide a non-linear response to the changing dimension being gaged. These sensing heads are only normally sensitive to progressive dimensional changes during the major portion of the machining operation, but they are highly sensitive to similar dimensional changes in the critical final phase of machining, as the gaged surface approaches its preselected target dimension.

These systems may employ any suitable indicator or control mechanism for displaying or employing the output signal of the sensing head to control further machining operations. In the figures, various sensing heads for compressed air gaging systems are illustrated, and one such gaging system is shown schematically in FIGURE 12.

In all of the gaging systems of this invention, an incremental dimensional change produces a different gaging response depending upon its location in the operating cycle. Early and intermediate dimensional changes will produce normal gaging responses, output signals, or pressure indications, while terminal dimensional changes in the critical final phases of the operating cycle will produce larger gaging responses. Thus, if a pressure indicator is employed, the operator will note rapidly-changing indicator readings over an expanded scale as the terminal dimension is approached. Automatic control elements may also be adjusted more easily and actuated more conveniently with the gaging systems of this invention.

In these systems, a sensing head generally indicated at 20 in FIGURES 1 and 2 is positioned and securely mounted adjacent a work surface 22. The sensing head 20 includes a stationary casing or cylinder 24 having slidably mounted therein a longitudinally-movable plunger mechanism 26. An air chamber 28 is formed in the body of plunger 26 and communicates with a throttle valve aperture 30 leading to a compressed air supply conduit 32. Chamber 28 also communicates with an exhaust port 34. A gaging trip 36 designed for contact with the work surface 22 is mounted on a threaded stud 38 adjustably secured within a threaded aperture 40 in the body of the plunger 26. A compression spring 42, acting between a threaded cap 44 and the plunger 26, urges the plunger toward the work surface 22, and the plunger 26 accordingly moves longitudinally away from the cap 44 until it reaches the movable stop member 46 projecting within the casing 24 into the chamber 28, as shown in FIGURE 1.

In the gaging system shown in FIGURE 12, it will be seen that compressed air at a supply pressure of 80 pounds, for example, is supplied to a regulator 60 designed to transmit compressed air at a constant pressure to the remainder of the system. This constant presure, which may be 40 p.s.i.g. for example, is shown on the regulator gage 62. Air passing from the regulator 60 is admitted by the valve 64 to the conduit 32 leading into the sensing head 20. Compressed air then passes from conduit 32 through throttle valve aperture 30 and chamber 28 to exhaust port 34, and is then vented to the atmosphere. The back pressure in conduit 32, which varies in response to changes in the size of the throttle valve aperture 30, is indicated on a pressure indicator 66. This back pressure may also be employed to actuate automatic control devices, pressure sensitive limit switches, and the like, for control of machining operations.

These gaging systems are useful in any precision machining operation and particularly in such production techniques as grinding and honing of internal bores.

The throttle valve aperture 30 preferably takes the form of a T-shaped opening through casing 24, as shown in FIGURES 2, 8–11, and 13–16. This T-shaped opening preferably includes a longitudinal slot portion 50 extending in the direction of travel of the plunger 26 and intersecting at one end with a transverse slit 52.

It will be apparent from FIGURES 3, 4, and 5 that the throttle valve aperture 30 may take different forms. Thus, for example, in FIGURE 3, the aperture 30a is formed with a diverging longitudinal slot 50a communicating with a triangular transverse opening 52a. In FIGURE 4, the throttle valve aperture 30b includes a longitudinal slot 50b communicating with a transverse aperture 52b by way of a widely-diverging section 51b. In FIGURE 5, the throttle valve aperture takes the form of a triangle with a transverse base 54 and an apex 56 longitudinally spaced from the transverse base 54.

An examination of FIGURES 8–13 will clearly show the operation of the gaging systems of the present invention. In FIGURES 8 and 9, the plunger 26 is shown in the position it will assume when the machining of the work surface 22 has progressed partway toward the desired dimension. In this position A, the valve edge 58 of the plunger 26 which forms the boundary of the chamber 28 is positioned directly inside the longitudinal slot 50. As the machining of the work progresses, the work surface 22 recedes further from casing 24 of the sensing head. Plunger 26 moves with the receding surface 22, and valve edge 58 moves along slot 50 toward the transverse slit 52. The longitudinal movement of plunger 26 down the sensing head casing 24 produces a small progressive reduction in the total area of the throttle valve aperture 30. This diminishing area of the aperture 30 thus produces a rising back pressure in the supply conduit 32.

Each small decrease in area of the throttle valve aperture 30, which is caused by movement of sensing plunger 26, is indicated by a slowly-changing reading on the indicator 66. The sensing head casing 24 is so positioned that plunger 26 approaches position B, shown in FIGURES 10 and 11, with valve edge 58 directly adjacent the transverse slit 52 of the throttle valve aperture 30, when the work surface 22 is closely approaching its desired target dimension. In this position, the longitudinal movement of the plunger 26, caused by the machining of surface 22, reduces the throttle valve aperture 30 at a rapidly-changing rate, causing a correspondingly rapid change in back pressure indicated on pressure indicator 66.

This non-linear gage sensing head 20 permits the gaging of a changing dimension with slowly-changing pressure indications during the major portion of the machining operation, and with rapidly-changing pressure indications as the machining operation nears its end.

The T-shaped throttle valve aperture 30 shown in FIGURES 2 and 8–16 may be used with a suitably-calibrated pressure indicator 66, which will have a portion of its scale corresponding to position A to reflect the progressive movement of plunger 26 along the longitudinal slot 50 over the major part of the machining operation, and a second portion of its scale corresponding to position B where plunger 26 has its valve edge 58 located directly beneath the transverse slit 52. The various forms of throttle valve apertures shown in FIGURES 3, 4, and 5 will require differently-calibrated scales for indicator 66, but they all produce a less-sensitive dimension indication during the early and intermediate machining portion of the operation, and a far more sensitive gaging indication for the terminal portion of the operation, as the machining nears its end.

The embodiment of the invention shown in FIGURES 6 and 7 employs a dual-tapered plunger 70 having a gently-tapered portion 72 of its periphery positioned adjacent a supply port 74 when the plunger 70 is in position A, and a more steeply-tapered portion 76 of its periphery in a position adjacent the supply port 74 during the final stages of the machining operation, position B. Thus in position A, the distance 78 from the gently-tapered surface 72 to the edge of the entrance port 74 changes slowly in response to longitudinal movement of the plunger 70. In position B, however, during the final approach to the target dimension, the distance 80 between the more steeply-tapered surface 76 and the same edge of the supply port 74 changes more rapidly in response to longitudinal movement of the plunger 70. Thus the back pressure in the supply port 74 will increase slowly as the plunger moves from left to right, until the steeply-tapered surface 76 comes into operation when the plunger reaches position B, after which point the pressure indicator 66 (FIGURE 12) reflects more rapidly-changing back pressures.

Returning to the non-linear casing apertures of FIGURES 1–5 and 8–15, the progressive changes in the area of a T-shaped throttle valve aperture 30 during gaging operations can be seen clearly in FIGURE 13. As the plunger 26 moves down the longitudinal groove 50 toward the transverse slit 52, the valve edge 58 leaves a progressively-smaller portion of the longitudinal slot 50 available for the admission of compressed air into the interior of the casing 24. When the valve edge 58 reaches the location 58a, where slot 50 adjoins slit 52, however, the rate of change in the air-admitting area of the throttle valve aperture 30 diminishes rapidly with further longitudinal movement of the plunger 26.

Various features of the sensing heads of the present invention make them adaptable for installation in systems for gaging substantial ranges of dimensional variations. It will be seen in FIGURE 1 that the gaging tip 36, which may have a carbide insert at its work-contacting surface 37, may be adjustably positioned relative to the body of the plunger 26 by adjustment of the threaded stud 38, and may be locked in any preselected position via the lock nut 39. Similarly, the casing 24 of sensing head 20 may be adjustably positioned within a housing 82 shown in FIGURES 1, 9, 12, and 15. The housing 82 may be fixedly mounted adjacent a moving work surface being machined, or the housing 82 may be movably or rotatably mounted adjacent a stationary work surface being machined.

The casing 24 is adapted to operate in various adjusted positions of the sensing head 20 within the housing 82, by means of an entrance aperture 84 shown in FIGURES 14–16. In these figures, a portion of the outer periphery of the casing 24 is shown cut away, adjacent the supply conduit 32, to provide an entrance aperture or chamber 84 communicating between supply conduit 32 and the throttle valve aperture 30. Thus in various adjusted positions of the casing 24 relative to the housing 82, compressed air from the supply conduit 32 will pass directly into the throttle valve aperture 30, producing the desired back pressure variations required for the operation of the gaging systems of the present invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

We claim:

1. In a dimension-gaging system, the combination of a source of compressed air, a sensing head assembly including a casing and a plunger in contact with the surface to be gaged and movably mounted in said casing, said plunger and said casing forming between themselves a throttle valve whose aperture changes at an increasing rate in response to linear movements of said plunger in one direction with respect to said casing and whose aperture changes at a decreasing rate in response to linear movements of said plunger in the opposite direction with respect to said casing, and a supply conduit connecting said source of compressed air to said aperture, whereby changes in the position of said plunger in response to changes in the dimension being gaged produce progressive non-linear changes in back pressure in said supply conduit.

2. In a dimension-gaging system, the combination of a regulated source of compressed air, a sensing head assembly including a casing having a compressed air supply port, a sensing plunger in contact with the surface to be gaged and slidably mounted in said casing, said plunger and said casing supply port forming between themselves a throttle valve aperture progressively varying non-linearly in area with the movement of said plunger, said throttle valve aperture being shaped to change its area slowly while said gaged surface is remotely approaching its final position, and to change its area more rapidly as said gaged surface nears the immediate vicinity of its final position, and a supply conduit connecting said source of compressed air to said supply port, whereby changes in the position of said plunger in response to changes in the dimension being gaged produce progressive non-linear changes in back pressure in said supply conduit.

3. A sensing head for dimensional gaging systems comprising, in combination, a head casing having a compressed air supply port and an exhaust vent, a gaging plunger slidably mounted within said casing and having a projecting tip in contact with the surface to be gaged, said plunger having an air chamber formed therein communicating between said supply port and said exhaust vent, said casing supply port being formed as an aperture whose width varies in the direction of movement of said gaging plunger, said air chamber having a terminating valve edge positioned to control the flow of compressed air through said casing supply port, the configuration of said aperture being such that the flow therethrough changes at an increasing rate in response to linear movements of said gaging plunger in one direction with respect to said casing and changes a decreasing rate in response to linear movements of said plunger in the opposite direction with respect to said casing, whereby progressive non-linear variations in back pressure at said supply port are produced by progressive movement of said gaging plunger toward and from its final position relative to said casing.

4. A sensing head for dimensional gaging systems comprising, in combination a head casing having a compressed air supply port and an exhaust vent, a gaging plunger slidably mounted within said casing and having a projecting tip in contact with the surface to be gaged, said plunger having an air chamber formed therein communicating between said supply port and said exhaust vent, said casing supply port being formed by a relatively narrow longitudinal opening connected to a wider transverse opening, with said air chamber having a terminating valve edge forming a boundary of said chamber and positioned for progressive closure of said longitudinal opening and of said transverse opening, whereby progressive non-linear variations in back pressure at said supply port are produced by progressive movements of said gaging plunger.

5. A sensing head for dimensional gaging systems comprising, in combination, a head casing having a compressed air supply port and an exhaust vent, a gaging plunger slidably mounted within said casing and having a projecting tip in contact with the surface to be gaged, said plunger having an air chamber formed therein communicating between said supply port and said exhaust vent, said casing supply port being formed as a substantially T-shaped aperture having a longitudinal slot terminating in a transverse slit, with said air chamber having a terminating valve edge forming a boundary of said chamber and positioned for progressive sliding closure of said longitudinal slot and of said transverse slit, whereby progressive non-linear variations in back pressure at said supply port are produced by progressive movements of said gaging plunger.

6. A sensing head for dimensional gaging systems comprising, in combination, a head casing having a compressed air supply port and an exhaust vent, a gaging plunger slidably mounted within said casing and having an adjustable projecting tip in contact with the surface to be gaged, said plunger having an air chamber formed therein communicating between said supply port and said exhaust vent, resilient means mounted in said casing urging said projecting tip into contact with said gaged surface, said casing supply port being formed in the shape of a T-shaped aperture having a longitudinal slot terminating in a transverse slit, with said air chamber being formed with a terminating valve edge forming a boundary of said chamber and positioned for progressive sliding closure of said longitudinal slot and of said transverse slit, whereby progressive non-linear variations in back pressure of said supply port are produced by progressive movements of said gaging plunger.

7. A sensing head for dimensional gaging systems comprising, in combination, a head casing having a compressed air supply port and an exhaust vent, a gaging plunger movably mounted within said casing and having a projecting tip resiliently urged into contact with the surface to be gaged, said plunger having formed in its periphery an air channel connecting said compressed air supply port to said exhaust vent, said plunger air channel being bounded by a gently-tapered portion of said plunger periphery and an adjoining more steeply-tapered portion of said plunger periphery, whereby progressive non-linear back pressure variations at said supply port are caused by the varying throttling effect between said compressed air supply port and said air channel as said gaging plunger moves progressively within said casing.

8. A sensing head for dimensional gaging systems comprising, in combination, a head casing having a compressed air supply port and an exhaust vent, a gaging plunger movably mounted within said casing and having a projecting tip in contact with the surface to be gaged, said plunger having formed therein an air channel connecting said compressed air supply port to said exhaust vent, said plunger air channel being bounded by a gently-tapered portion of said plunger and an adjoining more steeply-tapered portion of said plunger, whereby the varying throttling effect between said compressed air supply port and said air channel as said gaging plunger moves progressively within said casing causes progressive non-linear back pressure variations in said supply port.

9. A sensing head for dimensional gaging systems comprising, in combination, a head casing having a compressed air supply port and an exhaust vent, a gaging plunger slidably mounted within said casing and having a projecting tip resiliently urged into contact with the surface to be gaged, said plunger having formed in its periphery an air channel connecting said compressed air supply port to said exhaust vent, said plunger air channel being bounded by a gently-tapered frusto-conical portion of said plunger periphery and an adjoining more steeply-tapered frusto-conical portion of said plunger periphery, whereby as said gaging plunger moves progressively within said casing, the varying throttling effect between said compressed air supply port and said air channel causes progressive non-linear back pressure variations at said supply port.

10. In a dimension-gaging system, the combination of a regulated source of gaging fluid, a sensing head assembly including a casing having a fluid supply port, a sensing plunger in contact with the surface to be gaged and slidably mounted in said casing, said plunger and said casing supply port forming between themselves a throttle valve aperture progressively varying non-linearly in area with the movement of said plunger, said throttle valve aperture being shaped to change its area slowly while said gaged surface is remotely approaching its final position, and to change its area more rapidly as said gaged surface nears the immediate vicinity of its final position, and a fluid supply conduit connecting said source of gaging fluid to said supply port, whereby changes in the position of said plunger in response to changes in the dimension being gaged produce progressive non-linear changes in back pressure in said fluid supply conduit.

References Cited in the file of this patent

UNITED STATES PATENTS

| | | |
|---|---|---|
| 1,911,905 | Knowlton et al. | Mey 30, 1933 |
| 2,369,319 | Smith | Feb. 13, 1945 |
| 2,831,257 | Aller | Apr. 22, 1958 |
| 2,937,656 | Evans et al. | May 24, 1960 |